Sept. 5, 1933. H. V. HALL 1,925,634
WHEEL PULLER
Filed March 23, 1932 2 Sheets-Sheet 2
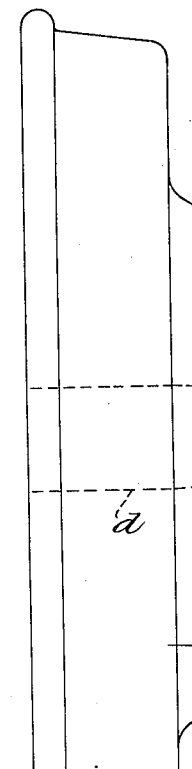
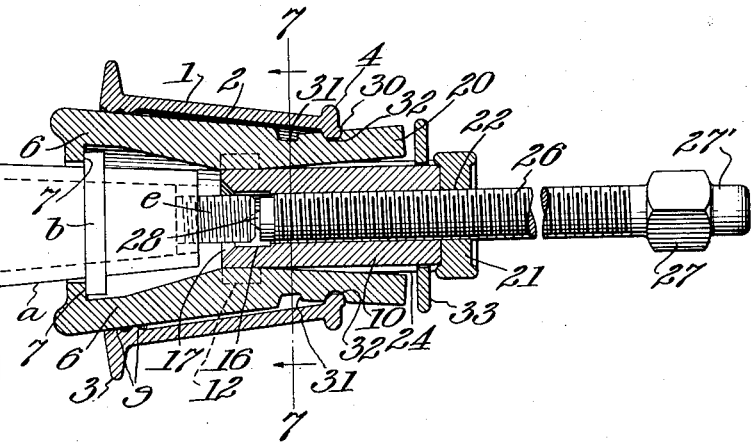
Fig. 8.
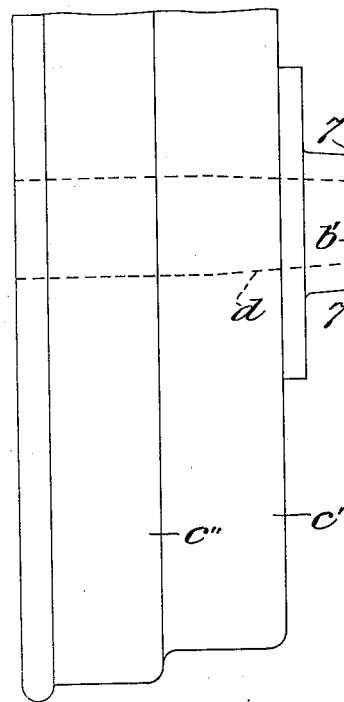
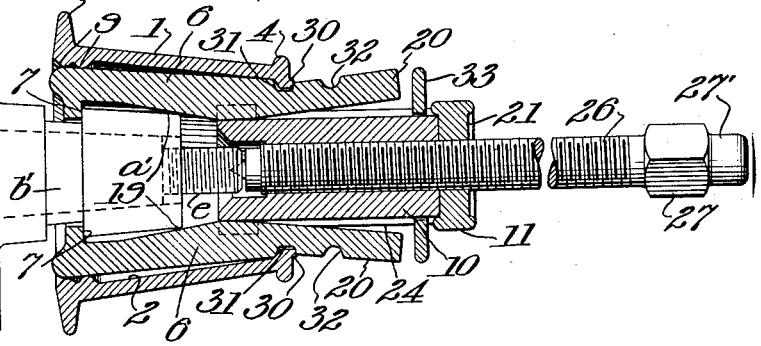
Fig. 9.
Inventor
Horace V. Hall
by
Wm H Finckel
Attorney Patented Sept. 5, 1933

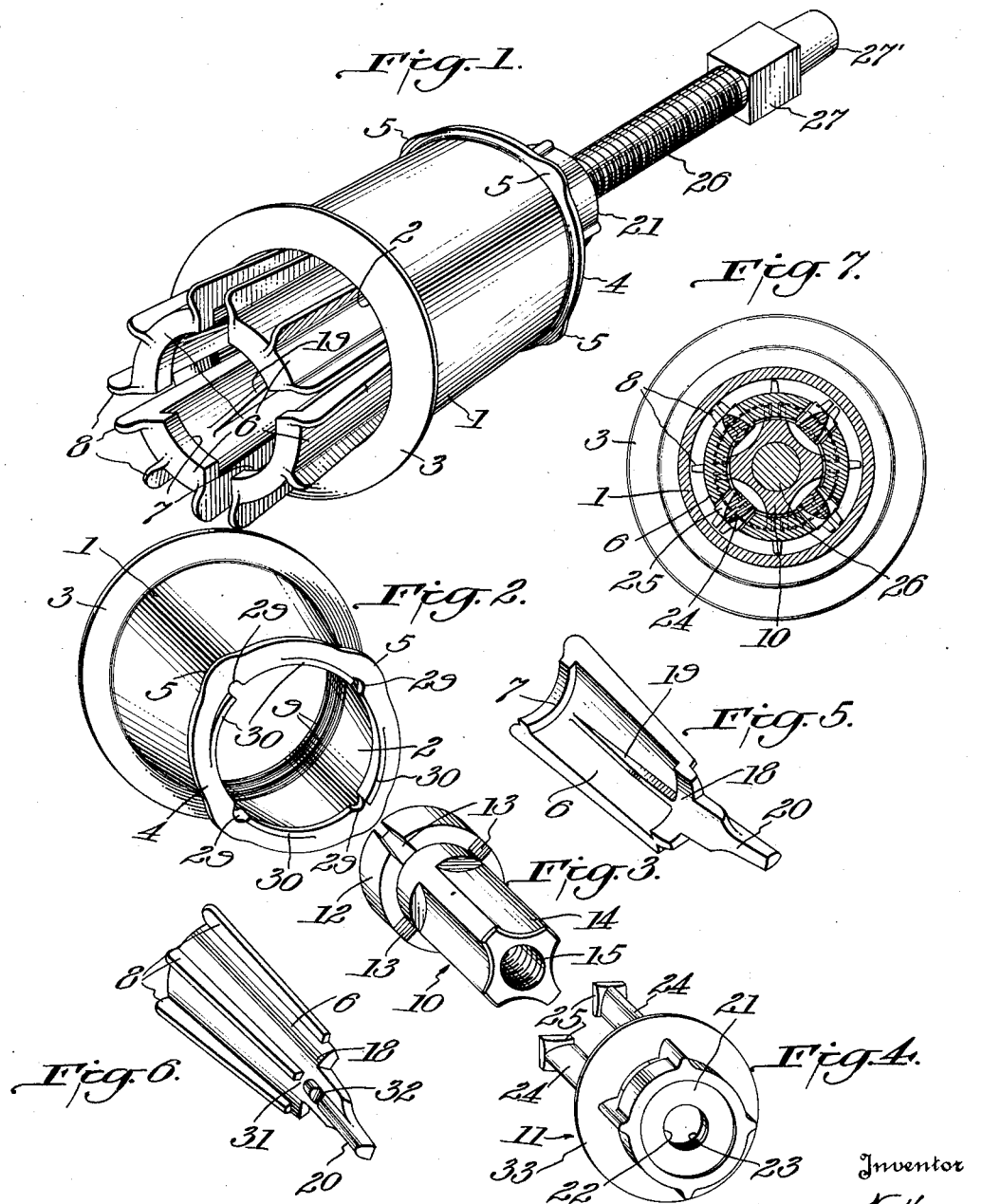

1,925,634

UNITED STATES PATENT OFFICE 1,925,634

WHEEL PULLER

Horace V. Hall, Atlanta, Ga.

Application March 23, 1932. Serial No. 600,746

12 Claims. (Cl. 29—85)

This invention relates to wheel pullers, that is to say, to devices for pulling wheels and other similar objects from axles or shafts on which they are fitted in relatively fixed frictional engagement.

One object of the invention is to provide a device of the character referred to which is relatively simple in construction, easily assembled and disassembled, and which may be easily and quickly applied to and removed from the part to be pulled.

Another object of the invention is to provide a wheel puller particularly adapted for pulling the wheels, or rather the wheel mounts, including the brake drums, from two models of a common type of standard automobile.

The invention consists in a wheel puller comprising a sleeve preferably having a tapered bore, a plurality of jaws embraced by said sleeve and relatively to which the sleeve may be axially adjusted, the jaws being arranged around and carried by a jaw carrier, preferably of two parts, between which and the sleeve the jaws are mounted in relatively fixed relation but capable of a pivotal action of such nature that their ends which are adapted to grasp the part to be pulled may be radially separated and contracted, the jaws being provided with angularly offstanding tail pieces cooperating with means on the sleeve whereby the jaws may be radially separated, and provided also with offstanding ribs or the like normally contacting with the bore of the sleeve whereby they may be radially contracted, this radial separation and contraction of the jaws being accomplished by axial movement of the sleeve relatively thereto, and the jaws and sleeve provided with cooperating means whereby the sleeve may be locked as regards its axial movement relatively to the jaws and the jaws thereby locked in adjusted position relatively to the part to be pulled, the jaw carrier provided with a screw member axially adjustable by screw threaded engagement with it to exert a pulling pressure or force against the end of the axle or shaft upon which the part to be pulled is mounted, all as will be explained more fully hereinafter and finally claimed.

In the accompanying drawings illustrating the invention, in the several figures of which like parts are similarly designated, Figure 1 is a perspective view of a wheel puller constructed in accordance with the invention, the parts being in such position that the jaws are in their fully extended and radially separated position. Fig. 2 is a perspective view of the sleeve detached, looking at the end opposite to that shown in Fig. 1. Fig. 3 is a perspective view of one part of the jaw carrier and Fig. 4 is a perspective view of the complemental part of the jaw carrier. Fig. 5 is a perspective view of the inner face of one of the jaw members, and Fig. 6 is a perspective view of the outer face thereof. Fig. 7 is a section taken substantially on the line 7—7 of Fig. 8. Fig. 8 is a schematic sectional elevation illustrating the wheel puller adjusted in position for pulling the wheel mount of one model of a standard automobile, and Fig. 9 is a similar view of the wheel puller adjusted in position to pull the wheel mount of another model of such standard automobile.

The sleeve 1 is preferably tapered from end to end thus providing a tapered bore 2, and the ends of the sleeve are provided with strengthening flanges 3 and 4, the flange 4 formed with offstanding lugs 5 by which it may be readily grasped. Arranged within the sleeve 1 is a plurality of similar jaws 6 having projecting grasping portions 7 complementally formed for engagement with a member of the part to be pulled, and having their outer faces provided with offstanding ribs 8 which normally contact with and bear against the bore of the sleeve 1 or with circumferential beads 9 formed therein. (See Figs. 2, 8 and 9.) The jaws 6 are arranged in this complemental manner relatively to the sleeve 1 upon a jaw carrier comprising two parts which may be referred to as an adapter, indicated at 10, and a holder, indicated at 11. The adapter 10 has a head portion forming an offstanding flange 12 grooved as indicated at 13, and a shank 14 provided with a central bore 15, screwthreaded as indicated, and having its head adjacent portion provided with a counterbore 16 having a chamfered opening 17. (See Figs. 8 and 9.) The jaws 6 are provided with shoulder portions 18, the inner faces of which engage with the flange 12, and carry on their inner faces ribs 19 which engage the recesses or grooves 13. Offstanding from the shoulder portion 18 of each jaw is a tail piece 20 angularly arranged relatively to the grasping portion and body of the jaw.

The holder 11 has a cap portion 21 bored, as indicated at 22, and provided with a screwthread 23, complemental to the screwthreaded bore 15 of the adapter 10. Offstanding from this cap portion 21 are legs 24 provided with feet 25, the legs 24 and their feet being so spaced around the circumference of the cap portion 21 as to leave openings between them for the reception of the tail pieces 20 of the jaw members.

When the jaw members 6 have been assembled within the sleeve 1 and upon the adapter 10 with their shoulder portions in engagement with the flange 12 of the member 10, as described, the holder member is arranged over the shank 14 with its legs 24 intermediate the tail pieces 20 of the jaw members, its feet 25 in engagement with the exposed outer surfaces of the shoulder portions 18 of the jaw members and its cap member 21 abutting against the end of the shank 14. With the parts thus arranged, the screw member 26, which is threaded complementally to the bores 15 and 23, is screwed into these bores and thus holds the two parts, the adapter and holder of the jaw carrier, in fixed assembly with the jaws held thereby and capable of relative radial pivotal movement thereon.

The screw member 26 which serves as the means whereby a pulling force or pressure is exerted, as will be explained, has a squared head 27 adjacent to its outer end and is provided with an extension 27' of said head whereby injury to the head will be prevented. At its inner end, the screw member is provided with a center point 28 for a purpose hereinafter appearing. As will be seen by reference particularly to Figs. 8 and 9, the screw member 26 has a relatively long screwthreaded engagement with the jaw carrier, and thus great force may be exerted to pull a wheel or the like without danger of stripping the threads between the screw member and jaw carrier.

The flange 4 of the sleeve 1 is provided with a plurality of recesses 29 complemental to the tail pieces 20 of the jaws and with which these tail pieces coact in their extension beyond the end of the sleeve 1. In addition to the recesses 29, the flange 4 is provided with a plurality of cam members 30 adapted for cooperation with notches 31 and 32 arranged in predetermined spaced relation upon the tail pieces 20.

The holder 11 of the jaw carrier is provided with a flange or skirt 33 of such diameter as to overlie the tail pieces of the jaws in all of their positions relatively to the jaw carrier and thus protect them against breakage or injury.

Reference is now made to Figs. 8 and 9 in which the mode of application of the device of the invention is illustrated. In Fig. 8 a wheel mount of the type employed in the Model A Ford automobile for the years 1928 and 1929 is shown, and in Fig. 9 a wheel mount of the type employed in the Model A Ford automobile for the years 1930 and 1931 is shown, and it is particularly for operation upon wheel mounts of these two types that the device of the invention is designed.

Referring to Fig. 8, it will be seen that the wheel mount shown therein comprises a bearing member $a$ to which the demountable wheel is applied, this bearing member having a flange or shoulder $b$ approximately midway of its length, and a brake drum member $c$ carried by the bearing member $a$. The drive or axle shaft $d$ extends through this wheel mount and has at its end a screw-threaded reduced portion $e$ which, when the wheel mount is assembled for use, has applied to it one or more nuts (not shown) by which the wheel mount is held upon the shaft.

In Fig. 9 the wheel mount is slightly modified in that the bearing member $a'$ instead of being provided with a shoulder or flange is recessed annularly, as indicated at $b'$, and the brakedrum is of double formation as indicated at $c'$, $c''$ for cooperation with the shoes of the service and hand brakes. The axle shaft $d$ is substantially the same as the form thereof illustrated in Fig. 8.

As has been previously indicated, the tail pieces 20 of the jaws are provided with two notches 31 and 32, and it is for the purpose of accommodating the wheel puller to these two particular forms of wheel mount that these two notches are provided in each of the jaws, the wheel puller being thus adapted for appropriate adjustment to cooperate with the bearing member of either type of wheel mount.

In applying the wheel puller to the wheel mount for the purpose of pulling same off of the axle shaft, the jaw carrier, if the jaws have been previously locked in position by engagement of either set of notches 31 or 32 with the cam members 30, is so rotated relatively to the sleeve 1, or vice versa, as to release the jaw members and permit their tail pieces 20 to enter the recesses 29. Then, with the sleeve 1 held in one hand and the outer end of the jaw carrier held in the other hand, these two parts are moved toward each other axially, which results in the tail pieces, due to their engagement with the recesses 29, camming the grasping ends of the jaws radially apart (substantially as illustrated in Fig. 1) to thus separate them a distance sufficient to permit them to be slipped over the end of the bearing member $a$ or $a'$, as the case may be, until the grasping portions 7 of the jaws are in position for engagement with the parts $b$ or $b'$. Assuming that the wheel puller is applied to the bearing member $a$ (Fig. 8) the sleeve is now pushed toward the wheel mount until the flange 4 of the sleeve 1 lies in alignment with the notches 32 of the jaws. Then with the jaw carrier, and consequently the jaws, held firmly against rotation, the sleeve is rotated counter-clockwise to thus cause the cam members 30 to enter the notches 32 of the jaws and securely lock them in proper position with their portions 7 in engagement behind the flange or shoulder $b$ of the bearing member $a$. Then the screw member 26 is screwed into the jaw holder until its center point 28 engages with the complemental recess formed for the usual lathe center in the end of the screwthreaded extension $e$ of the axle shaft. Then with an appropriate wrench or crank applied to the head 27 of the screw member 26, the screw member may be further screwed into the jaw carrier, thereby exerting a push against the end of the axle shaft which push is translated through the jaws 6 into a pull against the flange or shoulder $b$ of the bearing member $a$ of the wheel mount to pull it off of the shaft $d$. Application of the wheel puller to the wheel mount is facilitated by reason of the counterbored and chamfered formation of the bore of the jaw carrier, in that the screwthreaded extension $e$ of the axle shaft $d$ will enter the counterbore 16, its entrance being facilitated by the chamfer 17, and engagement of the center point 28 with the complemental recess in the end of the extension $e$ thus be assured, the wheel puller meanwhile being held in axial alignment with the bearing member $a$ of the wheel mount because of the cooperation between the extension $e$ and the counterbore 16.

If the wheel puller is applied to a wheel mount of the type illustrated in Fig. 9, the cam members 30 of the sleeve 1 instead of being engaged with the notches 32 of the tail pieces 20 will be engaged with the notches 31 thereof, as shown, the operations necessary to apply the wheel puller to the wheel mount and to pull the wheel mount from the axle shaft being otherwise the same as those just described.

The wheel puller shown being designed especially for application to the two types of wheel mounts illustrated in Figs. 8 and 9 respectively, it is necessary that they have only the two sets of notches 31 and 32 in the tail pieces 20 of their jaws 6, but it is obvious that by providing intermediate or otherwise spaced notches the jaws may be locked in positions other than those particularly referred to.

The length of the screw member 26 will be such as to ensure complete removal of the wheel mount from the axle shaft, or at least insure such movement thereof as will free it from the shaft and permit it to be removed by hand. Furthermore, the pitch of the screw thread of the screw member 26 will be such that great force may be exerted through the screw member by the application of relatively slight force to turn it.

The wheel puller may be readily disassembled by simply removing the screw member 26 from the two parts 10 and 11 of the jaw carrier, thus permitting these parts to separate and freeing the jaws, so that the jaws and the adapter 10 of the jaw carrier may be slipped out of the sleeve through its larger end and the holder 11 of the jaw carrier removed from the opposite end. The wheel puller may be easily assembled by reversing these operations, and thus if any of the moving parts thereof become broken or worn past usefulness, they may be replaced easily and the wheel puller then returned to service.

By providing for automatic radial separation of the jaws by the camming action of their tail pieces 20 in engagement with the recesses 29, the application of the wheel puller to a wheel mount or other part to be pulled is greatly facilitated over wheel pullers now known.

Moreover, by providing the cam and notch arrangement for locking the jaws, application of the wheel puller is made more convenient, as it is necessary only to position the wheel puller relatively to the part to be pulled, adjust the sleeve axially of the jaws and give it a partial counterclockwise rotation. This cam and notch locking device has the further advantage that when the sleeve 1 is held against rotation, rotation of the screw member 26 clockwise, it having a right hand thread, will tend to more firmly lock the jaws and thus prevent their disengagement from the part being pulled during the pulling operation, as any torsional strain exerted upon the jaw carrier by the screw member will react in the same sense upon the jaws through the medium of the engagement of the ribs 19 with the recesses or grooves 13 of the adapter 10.

Various changes and modifications are considered to be permissible within the spirit of the invention and the scope of the following claims.

What I claim is:—

1. In a wheel puller, a sleeve, a plurality of adjustable jaws embraced by said sleeve, a jaw carrier to which said jaws are connected, a screw member carried by said jaw carrier, said sleeve movable relatively to said jaws to adjust same relatively to the part to be pulled, and interengaging means on said jaws and sleeve for positively locking said jaws in adjusted position.

2. In a wheel puller, a sleeve, a plurality of adjustable jaws embraced by said sleeve, a two part jaw carrier, means on said jaws whereby they are held in predetermined relation to each other and to the jaw carrier between the two parts of the latter, a screw member carried by said jaw carrier, said sleeve movable relatively to said jaws to adjust same relatively to the part to be pulled, and interengaging means on said jaws and sleeve for positively locking said jaws in adjusted position.

3. In a wheel puller, a sleeve, a plurality of adjustable jaws embraced by said sleeve, a two part jaw carrier, means on said jaws whereby they are held in predetermined relation to each other and to the jaw carrier between the two parts of the latter, a screw member carried by said jaw carrier and serving as a connecting means for the parts thereof and as the pressure applying member of the wheel puller, said sleeve movable relatively to said jaws to adjust same relatively to the part to be pulled, and interengaging means on said jaws and sleeve for positively locking said jaws in adjusted position.

4. In a wheel puller, a sleeve having a tapered bore, a plurality of adjustable jaws embraced by said sleeve, a jaw carrier to which said jaws are connected, a screw member carried by said jaw carrier, said sleeve movable relatively to said jaws and functioning by means of the cooperation of its tapered bore with said jaws to adjust same relatively to the part to be pulled, and interengaging means on said jaws and sleeve for positively locking said jaws in adjusted position.

5. In a wheel puller, a sleeve, a plurality of adjustable jaws embraced by said sleeve, a jaw carrier to which said jaws are connected, a screw member carried by said jaw carrier, said sleeve movable relatively to said jaws to adjust same relatively to the part to be pulled, and interengaging cam means on said jaws and sleeve for wedging and thereby positively locking said jaws in adjusted position.

6. In a wheel puller, a sleeve, a plurality of adjustable jaws embraced by said sleeve and provided on their sleeve-adjacent faces with offstanding ribs tapering from one end to the other and normally adjacent to the interior of said sleeve throughout its length, a jaw carrier to which said jaws are connected, a screw member carried by said jaw carrier, said sleeve movable relatively to said jaws to adjust same relatively to the part to be pulled, and interengaging means on said jaws and sleeve for positively locking said jaws in adjusted position.

7. In a wheel puller, a sleeve having a tapered bore, a plurality of adjustable jaws embraced by said sleeve and provided on their sleeve-adjacent faces with offstanding ribs tapering from one end to the other substantially in conformity with the taper of said bore and thus normally adjacent to the interior of said sleeve throughout its length, a jaw carrier to which said jaws are connected, a screw member carried by said jaw carrier, said sleeve movable relatively to said jaws to adjust same relatively to the part to be pulled, and interengaging means on said jaws and sleeve for positively locking said jaws in adjusted position.

8. In a wheel puller, a sleeve, a plurality of jaws embraced by said sleeve, a jaw carrier to which said jaws are connected, cooperating means on said jaw carrier and jaws serving to prevent relative rotation of same, a screw member carried by said jaw carrier and axially adjustable thereof by screwthreaded engagement therewith to apply pulling pressure, said sleeve movable relatively to said jaws to adjust same in pulling engagement with the part to be pulled, and cam means on said sleeve and jaws for positively locking the latter in adjusted position, rotation of said screw member during the pulling pressure applying operation tending to enhance the locking action of said cam means when said sleeve is held against rotation.

9. In a wheel puller, a sleeve, a plurality of jaws embraced by said sleeve and having tail pieces, means on said sleeve engaging said tail pieces for normally retaining the jaws in fixed relation circumferentially of the sleeve and for spreading their opposite ends apart radially, a jaw carrier with which said jaws are connected and upon which they may pivot radially, a screw member carried by and axially adjustable relatively to the jaw carrier whereby a pulling force may be exerted, said sleeve adjustable relatively to said jaws to move the jaws radially and position them for engagement with and disengagement from a part to be pulled, and interengaging means on said sleeve and jaws whereby the jaws may be positively locked in adjusted position.

10. In a wheel puller, a sleeve, a plurality of jaws, a two-part jaw carrier between the parts of which said jaws are associated in a pivotless hinged relation, a screw member capable of exerting a pulling force and by means of which the jaw parts are separably connected, said sleeve being axially movable to adjust said jaws, interengaging means on said sleeve and jaws for radially spreading said jaws upon their hinge connections, and cooperating means on said sleeve and jaws for positively locking said jaws in predetermined adjusted position.

11. In a wheel puller, a sleeve, a two-part jaw carrier, one carrier part having a radially offstanding head, a plurality of jaws having grasping portions and assembled around said jaw carrier and having shoulder portions engaged by said head, means on the other carrier part for engaging said shoulder portions in cooperation with their engagement by said head to hold the jaws axially relatively to the carrier, a screw member in screwthreaded engagement with said carrier parts and by which said parts are held in cooperative relation to said jaws, said screw member serving as a means of exerting a pulling force, said sleeve preventing disengagement of said jaws from said carrier, means on said jaws and on said sleeve for pivotally spreading the grasping portions of said jaws, and means on said jaws and on said sleeve for positively locking said jaws in predetermined adjusted position.

12. In a wheel puller, a sleeve, a two-part jaw carrier, one carrier part having a radially offstanding head, a plurality of jaws having grasping portions and assembled around said jaw carrier and having shoulder portions engaged by said head and tail pieces angularly arranged relatively to their grasping portions, means on the other carrier part and extending between said tail pieces for engaging said shoulder portions in cooperation with their engagement by said head to hold the jaws axially relatively to the carrier, a screw member in screwthreaded engagement with said carrier parts and by which said parts are held in cooperative relation to said jaws, said screw member serving as a means of exerting a pulling force, said sleeve preventing disengagement of said jaws from said carrier, means on said sleeve cooperating with said tail pieces for pivotally moving said jaws on said carrier to separate their grasping portions relatively radially, and interengaging means on said tail pieces and on said sleeve for positively locking said jaws in predetermined adjusted position.

HORACE V. HALL.